Henry C. Haynie
INVENTOR.

BY Murray Robinson

ATTORNEY

May 13, 1969  H. C. HAYNIE  3,443,638
PACK-OFF ASSEMBLY AND METHOD OF RUNNING PIPE
Filed June 9, 1967
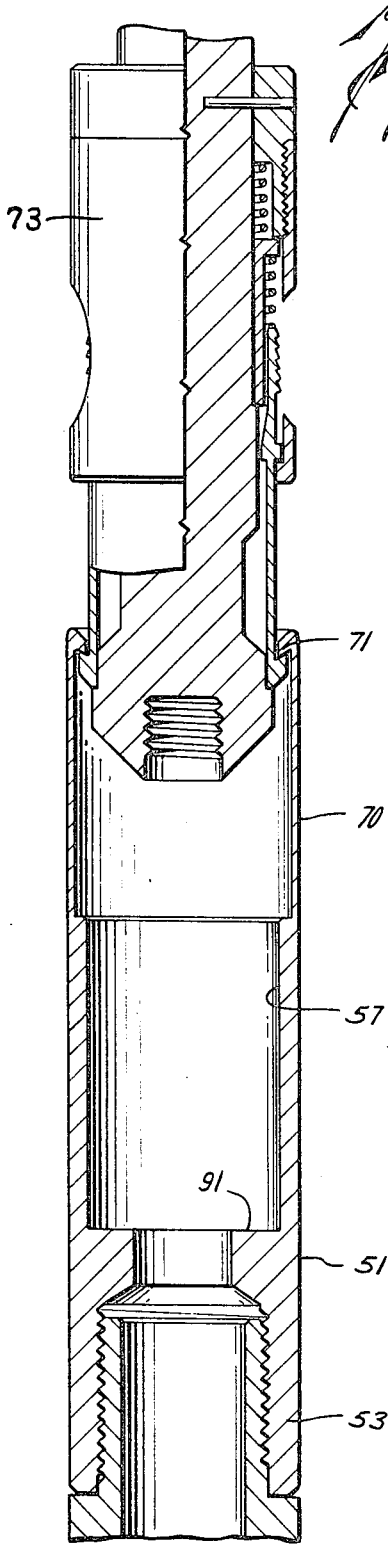
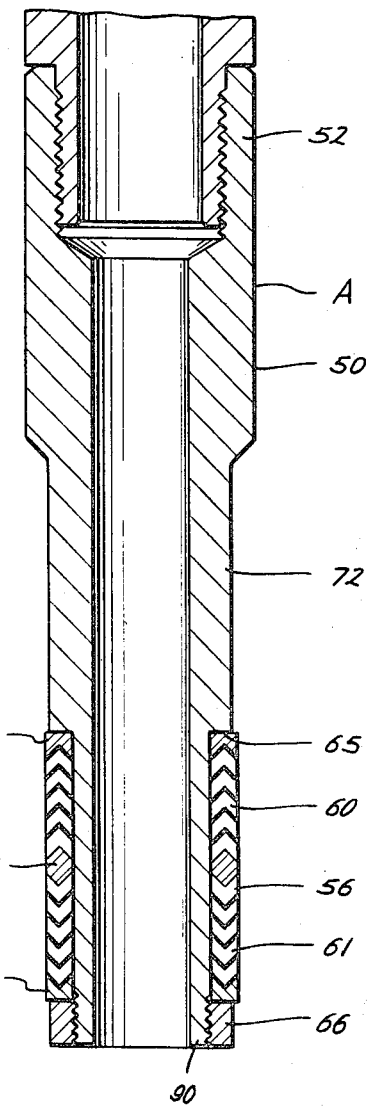
Henry C. Haynie
INVENTOR.
BY Murray Robinson
ATTORNEY May 13, 1969          H. C. HAYNIE          3,443,638

PACK-OFF ASSEMBLY AND METHOD OF RUNNING PIPE

Filed June 9, 1967          Sheet 4 of 4

Henry C. Haynie
INVENTOR.

BY Murray Robinson
ATTORNEY

United States Patent Office 3,443,638
Patented May 13, 1969

3,443,638
PACK-OFF ASSEMBLY AND METHOD
OF RUNNING PIPE
Henry C. Haynie, 8164 Glenview Drive,
Houston, Tex. 77017
Continuation-in-part of application Ser. No. 587,934,
Oct. 19, 1966. This application June 9, 1967, Ser.
No. 645,039
Int. Cl. E21b *31/00, 23/00;* F16l *17/02*
U.S. Cl. 166—277                                     16 Claims

ABSTRACT OF THE DISCLOSURE

A fluid conduit is to be run into a well pipe, e.g. to pack off a hole in the tubing, or to provide an additional fluid conductor extending to the top of the well. The well is under pressure and a lubricator is connected to the top of the tree. A slip type stop or a collar stop is lowered on a wire line from the lubricator into the well pipe and set at a desired level, e.g. below the hole in the tubing in the case of a pack off assembly, or between production zones in case the conduit to be run is the central conduit of a concentric multiple completion well. A first subassembly including a length of conduit having at its upper end the socket part of an extension joint and at its lower end being adapted to rest on the stop and having an overall length receivable in the lubricator is then run in from the lubricator on a wire line and set on the stop. If a hole in the well pipe is to be packed off, or if for other reason upper and lower zones of the well pipe are to be separated a sealing means is included near the lower part of the subassembly. Additional subassemblies, each including a length of conduit and having at the lower end the pin part of an extension joint and at the upper end the socket part of an extension joint are similarly run in on a wire line from the lubricator. When the desired level is reached, e.g. above the hole in the well pipe in the case of a packoff assembly, or the christmas tree in the case of a production tubing, gas string, or a kill pipe, a final subassembly is similarly run on a wire line from the lubricator. The final subassembly includes a length of conduit having at its lower end the pin part of an extension joint and at its upper end a slip type hold-down anchor and just below the anchor a sealing means to seal between the conduit and the well pipe, well head, or tree element. If the conduit is to be removed the subassemblies are pulled out on a wire line into the lubricator in the reverse order to that in which they were run in. Each subassembly includes at its upper end a connection means such as an inside or outside fishing neck to releasably engage the wire line running or retrieving tool. The extension joints each include a pin having a seal means therearound and a socket having an inside fishing neck thereabove.

Cross references to related applications

This application is a continuation-in-part of my prior application Ser. No. 587,934 filed Oct. 19, 1966, now abandoned, entitled "Pack Off Assembly," which was a continuation of my prior application Ser. No. 353,504, filed Mar. 20, 1964, now abandoned, entitled "Well Apparatus."

Background of the invention

This invention pertains to pack-off assemblies such as may be used for example, in oil wells to seal off an undesired hole in the tubing.

The object of the invention is to overcome difficulties heretofore encountered with such assemblies due to their length, such difficulties including difficulty in passing the assembly through crooked pipe and length limitations imposed by the need to pass through a lubricator when the assembly is required to be inserted in a well under pressure.

The invention is also useful in connecting together two pieces of pipe in a well or in running any amount of pipe into a well, especially under pressure, e.g. to provide a kill string, an acidizing, corrosion, or other treatment string, a gas pipe for gas lift, or a production string.

Heretofore, long lengths of screw threaded pipe have been run into a well under pressure with the aid of snubbers. It is not always convenient or feasible to provide snubbing equipment at many well locations, and such equipment is always expensive. Absent any snubbing equipment, the length of pipe that could be run into a well under pressure has been limited to the length of a lubricator, usually not more than one joint of pipe, e.g. 30 feet or so. The use of extra long lubricators to run in several joints of pipe, e.g. in the case of a pack off assembly, has also posed problems since a ninety foot stand of pipe is apt to get stuck in a crooked part of the well. In order to run in pipe strings of great length without snubbers it has been necessary to kill the well.

Summary of the invention

According to the invention the pack off assembly or other pipe string is divided up into lengths suitable for insertion with a conventional length lubricator and that will not be likely to become stuck in crooked pipe. The separate sub-assemblies are separately run into the well. Special means in the form of extension joints are provided for connecting the sub-assemblies after they have reached the desired location in the well.

Brief description of the drawings

For a detailed description of a preferred embodiment of the invention reference will now be made to the accompanying drawings wherein FIGURES 1A, 1B, and 1C, together form an elevation of a pack-off assembly, in accordance with the invention, including an extension joint, and showing schematically at the upper end of the assembly a wire line running tool;

FIGURES 5 and 6 separately show the socket and pin members of the extension joint shown in FIGURE 4, a running in tool being associated with the socket in FIGURE 5.

Description of preferred embodiments

Figure 1:
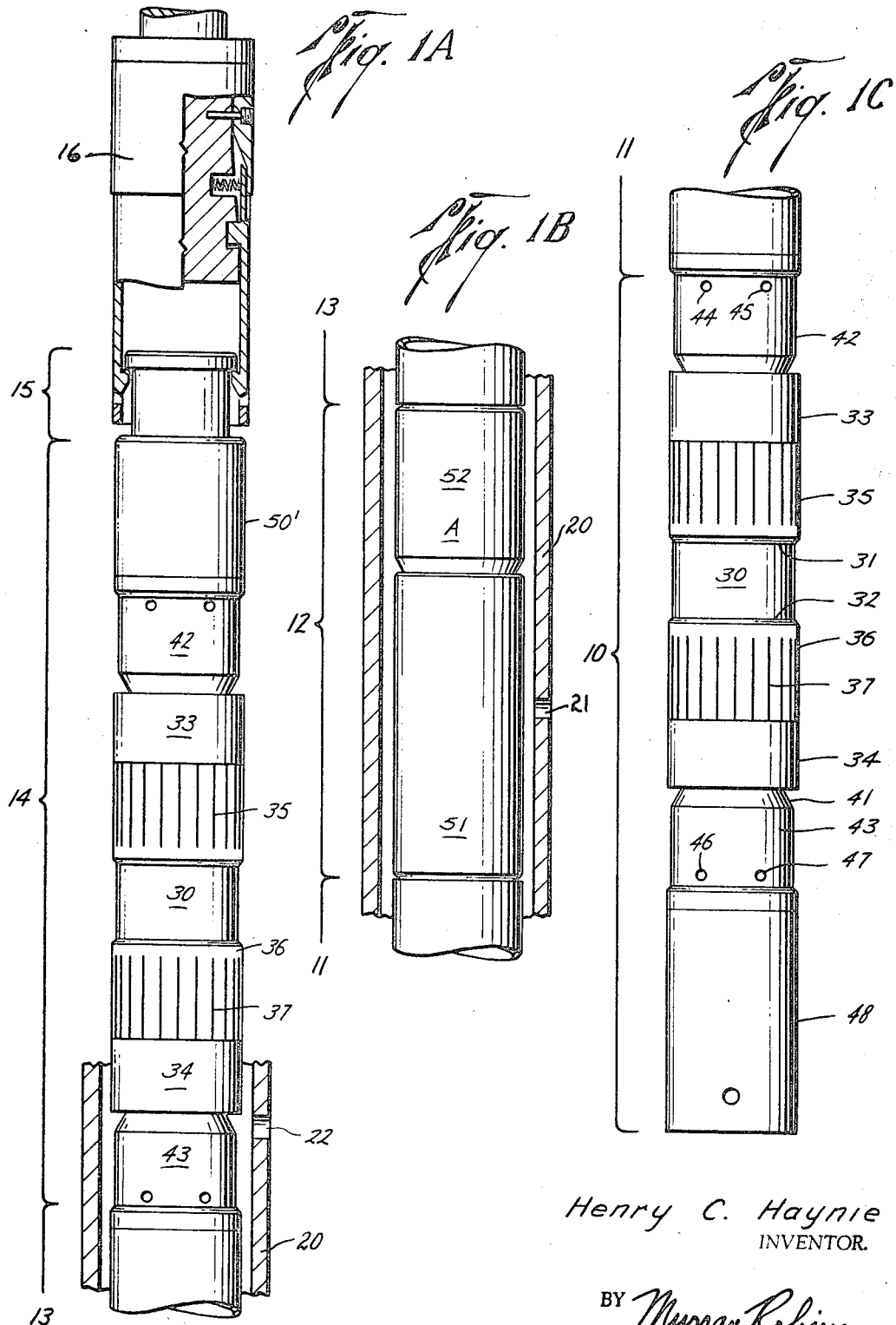

Referring to FIGURES 1A, 1B, 1C there is shown a pack-off assembly including a lower packing means 10, spacer pipe 11, extension joint 12, spacer pipe 13, upper packing means 14, and a wire line coupling means 15. A wire line running tool is shown schematically at 16 connected to coupling means 15. The running tool may be of the type shown at page 3931 of the 25th revision of the Composite Catalogue of Oil Field Equipment and Services wherein is illustrated and described a Type H Otis Running Tool. The whole assembly may be assembled in a well tubing such as shown at 20, the packing means bridging one or more ports such as 21, 22, in the tubing, which it is desired to seal off.

The pack-off assembly may be extended in length by means of additional extension joints and further lengths of spacer pipe, although only one such extension joint is shown in the drawings. For example, if it is desired to seal off a plurality of tubing ports spread out over a distance of four hundred fifty feet, there could be thirty-one 15 foot lengths of spacer pipe connected by thirty extension joints with one such joint between each adjacent pair of spacer pipes. The upper and lower pack-off means would be connected respectively to the uppermost and lowermost spacer pipes. The whole assembly would rest on top of a conventional tubing stop, (not shown) and if desired a conventional slip type hold down anchor could be placed on top.

Figure 2:
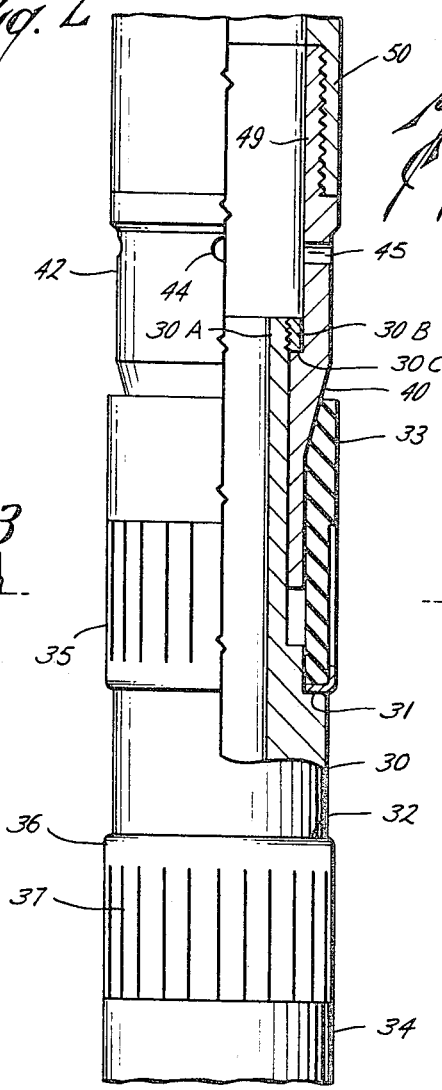
FIGURE 2 is an elevation, partially in section, through one of the pack-off means of the pack-off assembly shown in FIGURES 1A–C.
Figure 3:
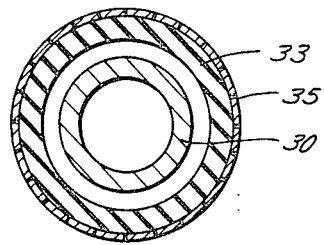
FIGURE 3 is a section taken at plane 3–3 of FIGURE 2.

The pack-off means 10 and 14 are themselves of conventional and like construction. Such means are described on page 3912 of the 25th edition of the Composite Catalogue of Oil Field Equipment and Services (1962–63) as being made by Otis Engineering Corporation (Type W Otis Pack Off Anchor). For example, as shown in FIGURES 2 and 3, the pack-off means may each include a tubular body 30 having reduced diameter upper and lower ends forming upwardly and downwardly facing shoulders 31, 32. Upwardly and downwardly opening annular rubber packer cups 33, 34 are mounted on the reduced ends of the body 30. The base of each cup is mounted in a brass ferrule, the upper cup in ferrule 35, the lower in ferrule 36. Each ferrule has a plurality of slits 37 in its periphery to permit expansion. Telescopically disposed at the reduced upper and lower ends 30A, of body 30 are conically tapered tubular expanders 40, 41, (see also FIGURE 1C) extending inside of cups 33, 34. The expanders are locked to body 30 by nuts 30B on the reduced ends 30A of the body 30 adjacent shoulders 30C. When expanders 40, 41 are moved closer together they force cups 33, 34 into sealing engagement with the tubing.

The cylindrical portions 42, 43 adjacent the conical portions of expanders 40, 41 are each provided with fluid bypass ports, as shown at 44, 45, 46, 47 to permit well fluid to move from below the packer means to above the packer means when the pack-off assembly is being run into the hole, and vice versa when the assembly is being removed from the hole, it being remembered that while running the assembly into the well or removing it, the fluid passage through the pack-off assembly as a whole is blocked by the wire line connection at the upper end of the assembly used in raising and lowering the assembly. There is a shoe 48 below the lowermost expander, adapted to seat on a tubing stop. Each expander is provided with a threaded pin 49 for engagement with a threaded box 50 on the adjacent spacer pipe, fishing collar, shoe, or other member of the assembly.

Figure 4:
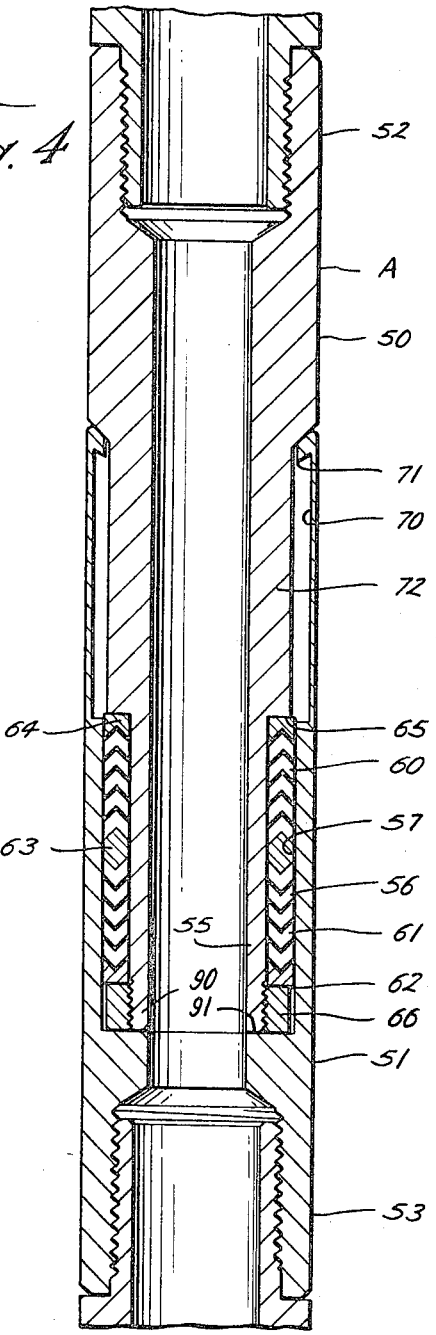
FIGURE 4 is an axial section through the extension joint part of the FIGURES 1A–C assembly.

Referring now to FIGURES 4–6, each extension joint comprises pin and socket members 50, 51 telescopically engageable, the pin entering the socket. The pin and socket are provided respectively with threaded boxes 52, 53 for connection to corresponding pins on the ends of the adjacent spacer pipes.

The pin 50 is provided at its lower part with a reduced diameter portion 55 on which is mounted sealing means 56 to seal with bore 57 of the socket member. The sealing means 56 includes a plurality of downwardly concave chevron seal rings 60 and a plurality of upwardly concave chevron seal rings 61 with back up rings 62, 63, 64 at the ends and intermediate thereof, the whole assembly being held between shoulder 65 on the pin and a retaining nut 66 screwed onto the lower end of the pin.

Extending up beyond bore 57 on the socket is an internal fishing neck 70 having an inturned lip 71 at its upper end. The fishing neck or tube 70 and lip 71 provide handling means to receive and engage a running tool, as will be described hereinafter. The pin 50, above the reduced portion 55 that carries the sealing means, is provided with a somewhat less reduced diameter portion 72 to receive the fishing neck 70 and its lip 71. Since as shown in FIGURE 4, the lip 71 projects inwardly to the same diameter as bore 57 of the socket member, there is left an annular space between tube 70 and pin portion 72.

When the pack-off assembly is installed in a well, a tubing stop is first set and then the lower pack-off assembly, spacer, and the socket part of the extension joint are lowered on a wire line until the shoe 48 rests on the tubing stop. The wire line is provided with an inside running tool or grapple 73 to fit inside the handling means provided by fishing neck 70 and engage lip 71, during this lowering operation. A suitable running tool is shown on page 3934 of the 1962–63 revision of the Composite Catalogue of Oil Field Equipment and Services wherein is illustrated and described at Otis Type G Running and Pulling Tool. The overall length of the sub-assembly thus lowered into place does not exceed that of the lubricator so that the operation can be carried on under pressure. The operation is repeated with the sub-assembly next above including at its lower end the pin member of the extension joint which is telescoped into the socket member therebelow. When the pin member of the joint fully engages the socket thereof, the lower extremity 90 of the pin rests against the shoulder member 91 in the socket to take the axial load. After all the sub-assemblies are in place, a wire line jar may be used to jar down on the assembly and expand the packer cups. Friction will usually be sufficient to retain them in expanded sealing position, but if need be a slip type hold down can be placed on top of the assembly.

Whenever it is desired to remove the pack-off assembly from the well, a wire line fishing tool with overshot grapple can be brought into engagement with fishing collar 15 to lift up and remove the upper pack-off assembly, spacer pipe, and the pin part of the uppermost extension joint. Then a wire line fishing tool with spear type grapple can be brought into engagement with fishing neck 70 to lift up and remove the remainder of the extension joint, and everything below it down to and including the pin part of the next extension joint, this process to be repeated until all is removed from the well.

Figure 7:
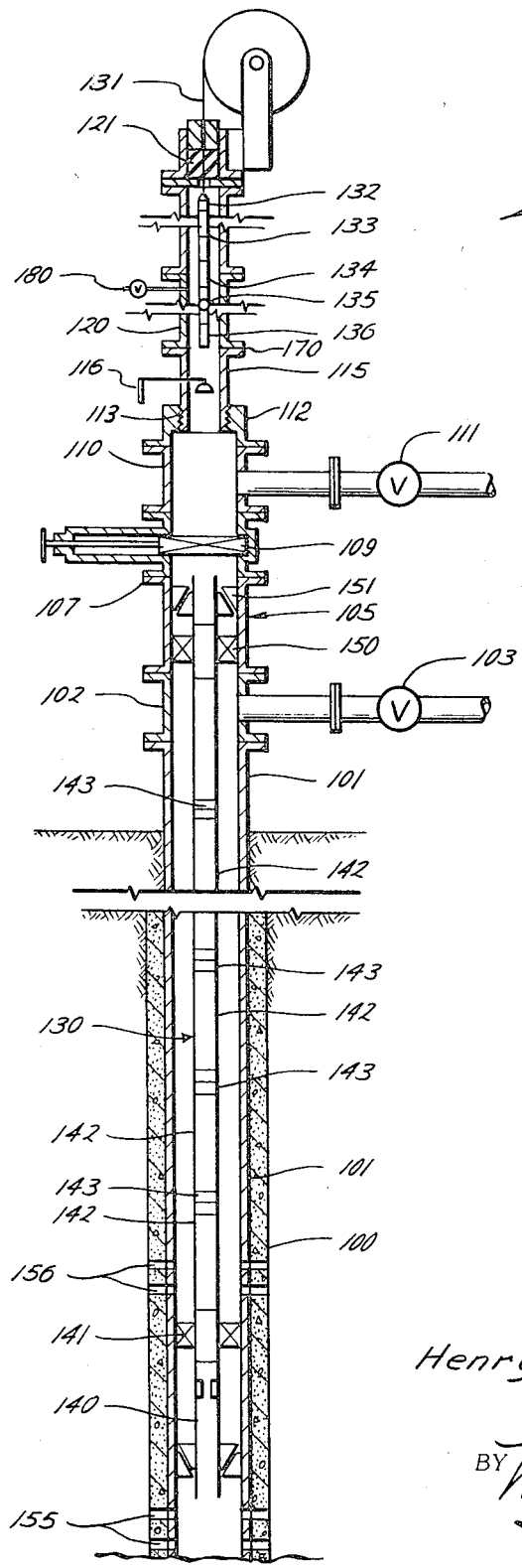
FIGURE 7 is a partly schematic vertical section through a well illustrating the method of the invention.

Referring now to FIGURE 7 there is illustrated a stage in the running of a string of production fluid conduit into a well in accordance with the method of the invention. For the most part the apparatus is conventional and has therefore been shown only schematically, reference being made to the literature for further details.

In FIGURE 7 there is shown a well including a casing 100 with cement 101' therearound throughout its entire length. A casing head 101 is screwed or welded to the upper end of the casing. A T 102 is flange connected to the top of the casing head. Fluid flowing into or out of the casing through the T may be controlled by wing valve 103.

On top of the casing head is connected a special tubing head 105 comprising a body 106 having a sized polished bore and upper and lower flanges 107, 108. Above the tubing head is connected a conventional master valve 109 and T 110. A wing valve 111 is connected to T 110 to control flow of fluid out of and into a tubing string sealed off in tubing head 105.

Above T 110 is connected a conventional top plate 112 having a threaded aperture 113 adapted to receive a plug or a pressure gage. The plug has been removed to accommodate the equipment for lubricating in the tubing. There is screwed into plate 112 in place of the plug the lower end 114 of a wire line blow out preventer 115. The preventer is adapted to be closed with lever 116, and to seal regardless of whether or not a wire line is present therein. A suitable form of such apparatus is illustrated on page 3637 of the 1962–63 edition of the Composite Catalogue of Oil Field Equipment and Services as being available from Oil Field Machine & Supply Co.

Connected to the top of the blow out preventer is a lubricator 120. Such a lubricator, called a tubing lubricator 120. Such a lubricator, called a tubing lubricator, is shown in more detail on page 752 of the aforementioned Composite Catalogue of Oil Field Equipment and Services as being available from Bowen Itco Inc. The lubricator may include several tubular sections connected together end to end, as shown. At the upper end of the lubricator is a wire line control head 121. Such a head is shown in more detail on page 3939A of the aforesaid catalogue as being available from Otis Engineering Corporation, being there described as a wire line stuffing box.

FIGURE 7 illustrates the apparatus just after a string of tubing 130 has been run in and prior to the removal of the blow out preventer and lubricator and wire line control head. Within the lubricator, still suspended from the wire line 131, is a string of wire line tools including a rope socket 132, weight bar 133, jars 134, knuckle joint 135, and running or pulling tool 136. Such tools are shown in more detail on page 3929 of said catalogue as being available from Otis Engineering Corporation.

Within the well, the tubing string 130 rests upon a support means 140 preferably of the slip type. Such a stop is shown in detail on page 3912 of said catalogue, described as a "bottom tubing stop" and indicated to be available from Otis Engineering Corporation. Alternatively, if the weight of the tubing string is not too great, a collar stop, as shown on page 3911 of said catalogue may be used.

On top of stop 140 is a lower packing means 141 which may be of the type shown on page 3912 of said catalogue. The packing means is also shown herein at 10 in FIGURE 1C. The packing or sealing means 141 seals between the casing 100 and the tubing 130. If there is no need for such a seal under a particular set of well completion conditions, the packing or sealing means 141 may be omitted, but usually it will be required.

The tubing string 130 is made up of a number of lengths of pipe 142 similar to the spacer pipes 11 and 13 previously described in connection with FIGURES 1A, 1B, and 1C, adjacent lengths of pipe being connected together by extension joints 143 similar to extension joint 12 previously described.

At the upper end of the tubing string is connected a sealing or packing means 150 similar to packing means 14 previously described and shown in FIGURES 1A and 2. Such a packing means is also shown on page 3912 of said catalogue as a top pack off section. On top of the packing means 150 is secured a slip type hold down anchor 151. Such an anchor is also shown on page 3912 of said catalogue. The hold down anchor 151 and the top packing means 150 are set in the smooth bore of the special tubing head 105.

In running the tubing string into the well, first the stop 140 is run in, then the lower packing means 141 together with the lower half (socket) of an extension joint 143, then successive subassemblies each including a length of pipe 142 with an extension joint pin on the bottom and an extension joint socket on top. Finally, the upper packing means 150 and hold down anchor 151 are run in. Before each portion of the string is run in, the preventer 115 is closed and the lubricator disconnected from the preventer at 170, which is preferably a quickly assembled and disassembled connection. The part of the string to be run is attached to the running tool 130 at the lower end of the string of wire line tools and drawn up into the lubricator. The lubricator is then reconnected to the preventer and the preventer opened to admit well pressure into the lubricator. The part of the tubing string in the lubricator is then lowered through the well head assembly including top plate 112, T 110, master valve 109, special tubing head 105, T 102, and casing head 101 into the well casing 100 and brought to rest on the part of the string therebelow. The running tool is then freed from the part of the tubing string just lowered in and the wire line tools are hoisted up out of the well into the lubricator. The preventer is closed, the vent valve 180 opened to lower the lubricator internal pressure, and the connection 170 broken to permit the next part of the tubing string to be inserted. This procedure is repeated until the entire tubing string has been run in, the condition shown in FIGURE 7. The jarring of the wire line tools that accompanies release of the running tool sets the upper sealing means and hold down anchor, and also the lower sealing means 141 (if used). After the tubing string has been run in the preventer and lubricator are removed and the pressure gage or plug installed in the top plate 112. If desired, the final part of the tubing string, comprising hold down anchor 151, may be provided with an outside fishing neck similar to that shown at 15 in FIGURE 1A, instead of an inside fishing neck as shown at 70 in FIGURE 5. Also, outside fishing necks could also be used on the sockets of the extension joints, but inside fishing necks facilitate stabbing the pin part of each extension joint into the socket part. It would also be possible to run the extension joints upside down.

It is to be understood that the tubing string need not be broken up into the precise component parts hereinabove described, it being sufficient that each part above the stop include a lower portion telescopically engageable with the part of the string therebelow, and that each part below the hold down anchor include an upper portion telescopically engageable with the part of the string thereabove.

It is also to be understood that other forms of the stop, extension joints, sealing means, hold down anchor and other elements may be used besides those shown and described.

The tubing string 130 may be used for production, in which case well fluid will flow into the lower end of the tubing through or past the stop 140. There may be perforations in the casing 100 below the stop 140 to admit well fluid into the casing from the adjacent earth formation. Frequently production will also be had from another zone of the formation, e.g. through casing perforations 156 above the packing means 141. Such well fluid as enters the casing above packing means 141 will flow up and out the casing 100 through T 102 and valve 103, whereas well fluid entering the casing below the packing means 141 will flow up and out the tubing 130, master valve 109, T 110, and valve 111.

Whenever it is desired to pull the tubing, the lubricator and associated wire line equipment may be installed as shown in FIGURE 7 and the tubing pulled, under pressure, a section at a time, similar to the method of removing the pack off assembly as previously described in connection with FIGURES 1A, 1B, 1C, and 2–6.

More than one string of tubing can be run into the same well, at the same time or successively, either with the strings parallel or coaxial, using the method of the invention, it being necessary only to provide a lubricator of the required diameter and length to accommodate each subassembly comprising tubing section and associated parts of the extension joint, together with appropriate bottom hole and well head support means, packing means, and hold down means.

While preferred embodiments of the invention have been shown and described, modifications thereof can be made by one skilled in the art without departing from the scope of the invention.

That being claimed is:

1. An extension joint comprising upper and lower connector means for connecting and disconnecting vertically extending rigid pipes that are disposed in a vertically extending passage, one of said connector means including:
   a tubular pin means and the other of said connector means including
   a tubular socket means to telescopically receive and release said pin means,
   said upper connector means having sealing means around said tubular means thereof and
   said lower connector means having a smooth annular land on said tubular means thereof telescopically, removably receiving said sealing means in engagement therewith, said connector means having cooperating shoulder means extending annularly thereabout to transfer the downward gravity load of the upper connector means to the lower connector means, said lower connector means having fishing means at its upper end to receive and releasably engage a wire line running tool for lowering said upper connector means into such vertically extending passage and to receive and releasably engage a wire line fishing tool for lifting said upper connector means while in such vertically extending passage, said fishing means telescoping past the adjacent part of the upper connection means.

2. Method of closing off an opening in a string of tubing comprising the steps of:
(a) running into the tubing on a wire line to a position below said opening a support member,
(b) similarly running in a first sub-assembly including a pack-off means, and the lower part of a telescopic pipe connection,
(c) placing the first sub-assembly on said support member, with said pack-off means below said opening,
(d) similarly running in a second sub-assembly including the upper part of a telescopic pipe connection and a pack-off means,
(e) and placing said upper part of the telescopic pipe connection in engagement with said lower part and with said pack-off means of the second sub-assembly above said opening.

3. Method according to claim 2 including between steps (c) and (d) the steps of:
(f) similarly running in a third sub-assembly including a spacer pipe having at its upper end the upper part of a telescopic pipe connection and at its lower end the lower part of a telescopic pipe connection, and
(g) placing the last said part of a pipe connection in engagement with the correlative part of the first sub-assembly and placing the correlative part of the second sub-assembly in engagement with the pipe connection part at the upper end of the third sub-assembly.

4. Method according to claim 3 in which additional spacer pipe sub-assemblies are similarly run in and placed.

5. Method according to claim 4 in which all said sub-assemblies are run in under pressure through a lubricator.

6. An extension joint comprising a tubular pin member and a tubular socket member, said pin member having sealing means around its lower part and said socket member having a bore telescopically, removably receiving said sealing means in sealing engagement therewith, said socket member having an internal shoulder against which seats the pin member, said socket member having a fishing neck at its upper end telescoping over the adjacent part of the pin member, said fishing neck having an inturned lip and said pin member having a portion above the seal means thereon adapted to receive said lip of the fishing neck, said pin and socket members each including a body portion of full outer diameter with threaded connection means at one end thereof, said pin member having a portion of somewhat reduced outer diameter adjacent said body portion forming with said body a downwardly facing shoulder, said portion of somewhat reduced outer diameter receiving said fishing neck, the inturned lip of said fishing neck lying adjacent said shoulder, said pin member having a further reduced outer diameter portion below said somewhat reduced diameter portion forming therewith a second downwardly facing shoulder, the lower end of said pin member being threaded and carrying a threaded retainer ring, said sealing means including a plurality of rings of sealing material held between said second shoulder and said retainer ring.

7. Combination including a plurality of tubular pack-off means, and spacer pipe means and extension joint means according to claim 6 between said pack-off means, said pack-off means each including a tubular body, seal cups mounted on the body facing the ends thereof, and expander tubes telescopically engaged with the ends of said body to expand the cups when moved toward each other.

8. A pack off assembly comprising, in combination:
upper and lower pack off means each including tubular flow conduit means having annular sealing means at its outer periphery adapted to seal between said flow conduit means and the inner surface of a well pipe,
at least one extension joint means comprising a tubular pin member and a tubular socket member telescopically receiving said pin member and sealing means for sealing the pin member to the socket member, and
a plurality of spacer pipe means, said extension joint means being disposed between said pack off means and at least one of said spacer pipe means being connected between each pack off means and the adjacent extension joint means and each extension joint means being connected at each end to one of said spacer pipe means.

9. A pack off assembly including an upper pack off means, a lower pack off means, a plurality of spacer means, and at least one extension joint means, said pack off means each including a tubular body, seal cups mounted on the body facing the ends thereof, and expander tubes telescopically engaged with the ends of said body to expand the cups when moved toward each other, said extension joint means each comprising a tubular pin member and a tubular socket member, said pin member having sealing means around its lower part and said socket member having a bore telescopically receiving said sealing means in sealing engagement therewith, said socket member having an internal shoulder against which seats said pin member, said pack off means, spacer tube means, and extension joint means, being serially connected with the pack off means at the upper and lower ends of the assembly and the spacer tube means and extension joint means being disposed between the pack off means in an alternating arrangement of spacer tube means and extension tube means with a spacer tube means at each end of said one extension joint means.

10. In a pipe connection including a tubular pin member and a tubular socket member adapted to telescopically receive the pin member but with the pin freely retractable from the socket, and including means to seal between said pin and socket members, the improvement comprising handling means to receive and engage with an inside running tool, said handling means extending from the mouth of said socket and comprising a rigid cylindrical tube affixed at one end to the socket member, said tube projecting axially beyond the mouth of said socket a distance of the same order of magnitude as the depth of said socket, the inner periphery of said tube being radially separated from the outer periphery of said pin member throughout said distance the tube projects beyond the mouth of said socket, and a continuous inturned lip at the end of said tube remote from said socket, the inner periphery of said lip having a diameter substantially the same as that of said socket.

11. In a well assembly in combination with a well casing having a well head means connected to its upper end and having a stop anchored in a portion of the casing below the well head, a tubing string inside said well casing resting on said stop and extending into said well head means, said tubing string comprising:
upper and lower tubular flow conduit means, the lower flow conduit means including a portion adapted to engage said stop and the upper flow conduit means including hold down anchor means to engage said well head means, at least the upper flow conduit means including sealing means therearound to pack off the annular space around the tubing string, at least one extension joint means including a pin member and a tubular socket member telescopically receiving said pin member and sealing means for sealing the pin member to the socket member, and a plurality of lengths of tubing, said extension joint means being disposed between said flow conduit means, and at least one of said lengths of tubing being connected between each flow conduit means and the adjacent extension joint means, and each extension joint means being connected at each end to one of said lengths of tubing.

12. Combination of claim 11 wherein said lower flow conduit means includes sealing means therearound to pack off the annular space around the tubing string inside the casing.

13. Method of setting a first well pipe inside a second well pipe under pressure from a lubricator comprising the steps of:
 (a) running into the second pipe on a wire line from the lubricator to a position at a desired level below the lubricator a support member,
 (b) similarly running in a first subassembly including at its lower end a portion adapted to engage said support member and at its upper end the lower part of a telescopic pipe connection,
 (c) placing said first subassembly on said support member,
 (d) similarly running in a second subassembly including a length of said first pipe having at its upper end the upper part of a telescopic pipe connection and at its lower end the lower part of a telescopic pipe connection,
 (e) placing the last said part of a pipe connection in engagement with the correlative part of the subassembly therebelow,
 (f) similarly running in another subassembly including at its lower end the upper part of a telescopic pipe connection and thereabove sealing means and hold down means,
 (g) placing the last said part of a pipe connection in engagement with the correlative part of the subassembly therebelow.

14. Method of claim 13 including the step of running in a lower sealing means with the first subassembly to seal between the first and second well pipes.

15. Method according to claim 13 including between steps (e) and (f) thereof the procedure of repeating steps (d) and (e) as often as necessary to run in lengths of said first pipe sufficient to extend from said support member to the desired level nearer the top of the well.

16. A length of rigid pipe having at its respective ends upper and lower connector means in accordance with claim 15.

References Cited

UNITED STATES PATENTS

| | | | |
|---|---|---|---|
| 169,659 | 11/1875 | Rankin | 285—374 |
| 747,493 | 12/1903 | Scruggs | 285—319 |
| 1,736,117 | 11/1929 | Granger | 166—191 |
| 2,393,404 | 1/1946 | Otis | 166—48 |
| 2,574,625 | 11/1951 | Coss | 285—347 |
| 2,738,016 | 4/1956 | Lynes | 166—191 |
| 2,902,093 | 9/1959 | Brown | 166—119 |
| 2,994,380 | 8/1961 | Tausch et al. | 166—191 |

JAMES A. LEPPINK, *Primary Examiner.*

U.S. Cl. X.R.

166—119, 191, 315; 285—319, 374

PO-1050
(5/69)

UNITED STATES PATENT OFFICE
CERTIFICATE OF CORRECTION

Patent No. 3,443,638            Dated MAY 13, 1969

Inventor(s) HENRY C. HAYNIE

It is certified that error appears in the above-identified patent and that said Letters Patent are hereby corrected as shown below:

Column 1, in the subheading, after "Continuation-in-part of application Ser. No. 587,934, Oct. 19, 1966" insert --, which was a continuation of application Ser. No. 353,504, filed March 20, 1964--.

SIGNED AND
SEALED
MAY 5 1970

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,443,638          Dated   May 13, 1969

Inventor(s)  Henry C. Haynie

It is certified that error appears in the above-identified patent and that said Letters Patent are hereby corrected as shown below:

Column 7, line 36, after "its", change "upper" to --lower--; line 37, after "its", change "lower" to --upper--. Column 9, line 34, after "its", change "upper" to --lower--; line 36, after "its", change "lower" to --upper--.

SIGNED AND
SEALED
JUL 21 1970

(SEAL)
Attest:

Edward M. Fletcher, Jr.
Attesting Officer

WILLIAM E. SCHUYLER, JR.
Commissioner of Patents